United States Patent [19]
Little

[11] Patent Number: 5,657,572
[45] Date of Patent: Aug. 19, 1997

[54] TAMP ASSEMBLY

[76] Inventor: Frank Little, 405 Redstone, Las Vegas, Nev. 89128

[21] Appl. No.: 578,836

[22] Filed: Dec. 26, 1995

[51] Int. Cl.[6] ................................................ A01K 97/26
[52] U.S. Cl. ............................ 43/1; 43/54.1; 43/4; 220/8
[58] Field of Search ...................... 43/1, 4, 44.99,
43/54.1, 42.25; 269/287, 907; 83/684, 686, 685; 220/8; 206/388; 30/316; 131/247, 177, 184.1

[56] References Cited

U.S. PATENT DOCUMENTS

| | | | |
|---|---|---|---|
| 2,049,645 | 8/1936 | Fleckles | 220/8 |
| 2,166,585 | 7/1939 | Evans | 43/1 |
| 2,178,301 | 10/1939 | Grant | 43/42.25 |
| 2,491,702 | 12/1949 | Arnold | 289/17 |
| 2,645,832 | 7/1953 | Lee | 24/136 R |
| 3,909,969 | 10/1975 | Finch | 43/1 |
| 4,050,176 | 9/1977 | Asper | 43/1 |
| 4,277,891 | 7/1981 | Dick | 30/316 |
| 4,566,213 | 1/1986 | Cossin | 43/1 |
| 4,660,314 | 4/1987 | Janssen et al. | 43/4 |
| 4,796,372 | 1/1989 | Klein | 43/4 |
| 5,209,248 | 5/1993 | Slade, Sr. | 131/232 |
| 5,230,177 | 7/1993 | Hanley | 43/1 |

OTHER PUBLICATIONS

Bass Pro Shops Catalog 1990, "Hair Stacker", item 274–869, p. 117.
Bass Pro Shops Catalog 1995, "Hair Stacker", item 491–460, p. 147.

*Primary Examiner*—Jeanne Elpel
*Attorney, Agent, or Firm*—Quirk & Tratos

[57] ABSTRACT

A tamp assembly comprises a first elongated hollow tubular member having first and second open ends, the second end having an edge with one or more notches or scallops, and a second elongated hollow tubular member for receiving the first member and an open end for inserting the second end of the first member and a closed end for tamping the second end of said first member thereagainst.

23 Claims, 2 Drawing Sheets

TAMP ASSEMBLY

BACKGROUND OF THE INVENTION

In preparing and tying artificial fishing flies, strands of hair, commonly natural deer hair, are often used. Deer hair, desirable for many artificial flies, is hollow and will float on water. The hairs, cut from a pelt, are naturally closed at the terminus, and open at the cut or sheared end. When the fly is tied, the open end is closed by thread in the tying process. Such fly tying and assembly is well known to those skilled in the art and is not the subject of the present invention.

The hairs used in tying flies are often and preferably held in a tamp device until they are needed. The tamp device includes a hollow cylindrical member, open at both ends. The operator pushes the hairs into the hollow member at one open end, and, when the hair is needed, tamps the tube at the opposite end and pulls the desired hairs out from the tamp end of the tube with his or her fingers. A problem or inconvenience with such a device is that the tamp end of the cylinder containing the hairs comprises a substantially planar circular edge whereby it is difficult to retrieve the hairs from the small circular opening. It is to the elimination of such an inconvenience that the present invention is directed.

SUMMARY OF THE INVENTION

The tamp assembly of the present invention includes an elongated hollow tubular member having opposite open ends, the tamp end having at least one notch or scallop therealong so that the hairs can be readily retrieved by the user with his or her fingers as they are exposed in the one or more notches or scallops. In another embodiment of the invention, the assembly includes a tamp base member having a biased or cushioned tamp seat for tamping the cylindrical member when hair is to be retrieved or removed therefrom. These as well as other features of the invention will be evident from the following detailed description.

DETAILED DESCRIPTION OF THE INVENTION

Figure 1:
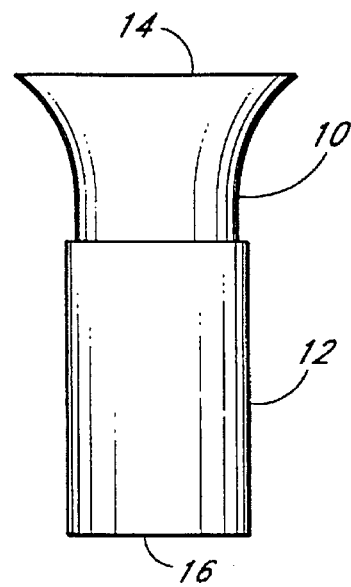
FIG. 1 is a side elevational view of the tamp assembly of the invention showing the nesting relationship of the first and second hollow tubular members.
Figure 2:
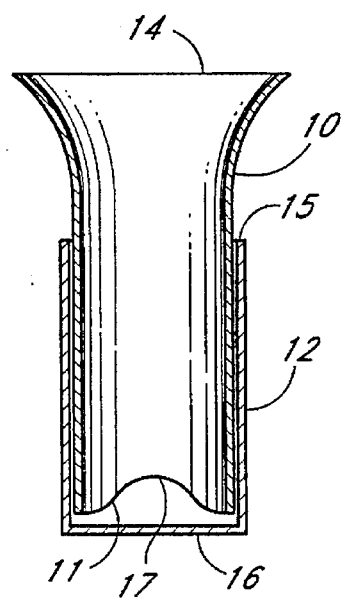
FIG. 2 is a side sectional elevation of the assembly of FIG. 1.

As shown in FIGS. 1 and 2, the tamp assembly includes a first member 10 and a second member 12 in which the first member is nested. In a preferred embodiment, these first and second members are substantially cylindrical, with the second member 12 having a somewhat larger diameter than the diameter of the first member whereby the first member can be selectively inserted and tamped within the second member to force the hairs downwardly toward the bottom edge 11 of the first member. Although these members are preferably cylindrical in shape along a substantial portion of their respective lengths, other cross-sectional shapes of the two components may be used, including square, elliptical, rectangular, and the like, so long as the first member 10 is capable of being inserted into the second member and readily removed after the assembly is tamped.

Figure 4:
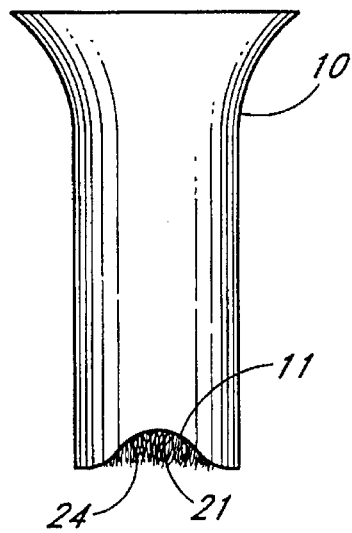
FIGS. 4 and 5 are side elevational views of a hollow tubular member having a pair opposite scallops formed along the open tamp end from which the hairs are retrieved.
Figure 5:
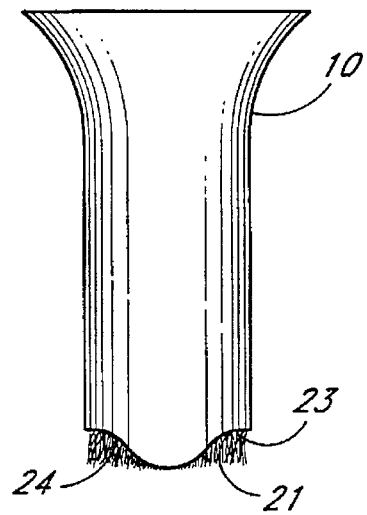
Figure 6:
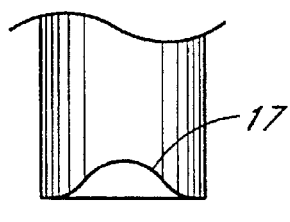
FIGS. 6-8 illustrate other embodiments of tamp end edges showing different numbers and sizes of scallops or notches therealong.

In a preferred embodiment, the first end 14 of first tamp member 10 is flared as illustrated so that the hairs can be more easily placed within the member. Thus, the flared end acts as a receptacle for inserting the hairs into the hollow cylindrical interior. The opposite end of the first cylindrical member is the tamp end, terminating in an edge 11 having one or more scallops, cut outs or notches therealong. In the embodiment illustrated in FIGS. 2 and 6, a scallop 17 is formed along the edge 11. In FIG. 5, the embodiment shown incorporates a pair of opposite scallops 23 and 24. FIG. 4 illustrates the full side view of scallop 24, with the hollow cylindrical tamp member 10 being rotated 90° from the position of that member shown in FIG. 5. In FIGS. 4 and 5, hairs 21 are shown extending below the edge 11 as those hairs would be positioned when the first tamp member 10 is retrieved or pulled out of the second tamp member 12 and after the first member 10 containing the hairs has been tamped in second member 12 or the assembly shown in FIG. 1 is tamped.

Referring again to FIGS. 1 and 2, the length of first tamp member 10 is greater than the length of second member 12. This relationship is important so that the first member can be easily inserted and tamped within the second member and then removed from the second member for retrieving the hairs which have been forced to the bottom of the first member 10. It will also be observed that the second member 12 is open at one end 15 for receiving the first member 10, and has a closed bottom tamp end 16 which bears and contacts the end of first member 10 during the tamping operation. Tamping may be carried out by sliding first member 10 up and down in second member 12. As the first member 10 is tamped within the second member 12, the bottom edge of the first member makes contact with the closed end 16 of second member 12, thereby forcing the hairs within the first member downwardly whereby these hairs become exposed through the one or more scallops or notches. Alternatively, with the first member fully inserted into the second member, the assembly may be tamped by forcing tamp end 16 of the second member against an object. Thereafter, the hairs may be readily retrieved by the operator once the first member is removed from the second member. FIGS. 4 and 5 illustrate the position of exposed hairs following tamping and removal of first member 10.

Figure 3:
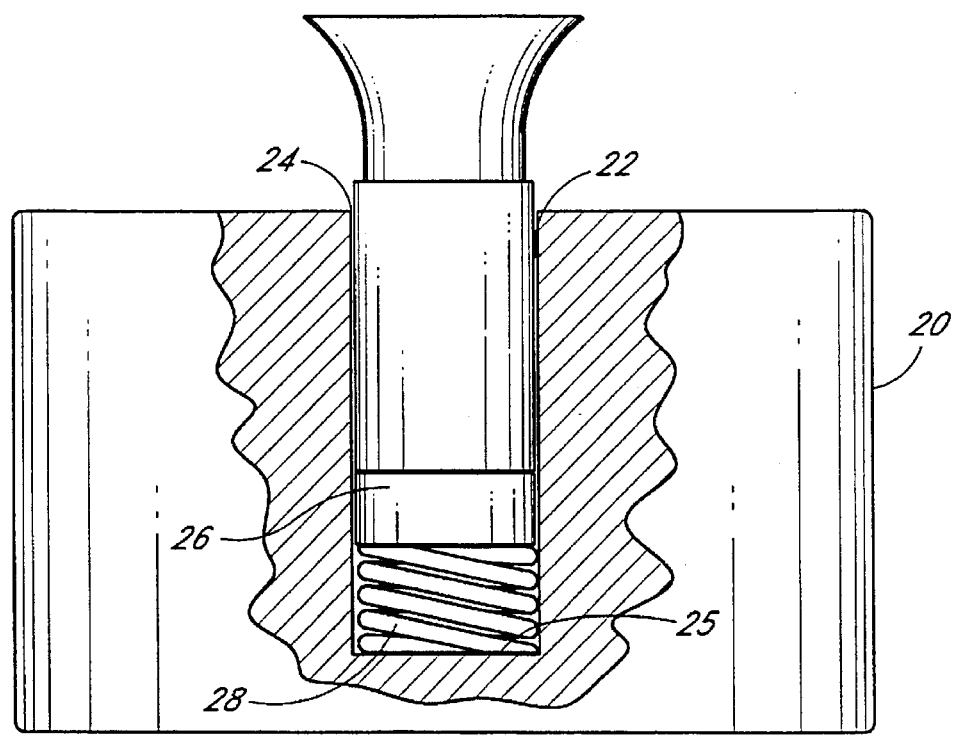
FIG. 3 is a side elevational view, partially in section, of another embodiment of the invention showing the first and second members of FIG. 1 positioned in a tamp base member of the assembly.

In FIG. 3 there is illustrated an embodiment of the invention in which the tamp assembly includes a tamp base member 20 having a cavity 22 in which the tamp members described and shown in FIG. 1 are inserted. The base member includes a tamp seat 26 and a spring 28 disposed between the tamp seat 26 and the bottom surface 25 of the cavity 22. Other cushion means including rubber cushion material such as flexible foam rubber or foamed elastomers or similar resilient materials which can be repeatedly compressed may be substituted for the spring. The tamp seat may be any suitable metal or plastic material, preferably having a shape so that it can be readily inserted into the cavity 22 via opening 24 and positioned as shown in FIG. 3. Preferably, the shape of tamp seat 26 is similar to the shape of side wall of cavity 22, and of course, at least slightly smaller so that the tamp seat can move upwardly and downwardly as the tamp members 10 and 12 are forced against the tamp seat in a tamping operation. Thus, the tamp base assembly of this embodiment provides a convenient and cushioned tamping station and operation for retrieving the hairs from the first tamp member 10 when desired for use in a fly tying operation or production. The base member 20 may be formed of any suitable material, preferably a weighted material such as a metal or heavier plastic, although that is not critical to the invention. The base member may be solid or hollow. It may also incorporate rubber or plastic feet or support members along the bottom for assisting in preventing it from sliding around during a tamping operation. Further, the tubular tamp components illustrated in FIGS. 1 and 2 may be made of any suitable material such as plastic, or metal as desired.

Figure 7:
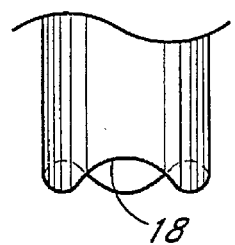
Figure 8:
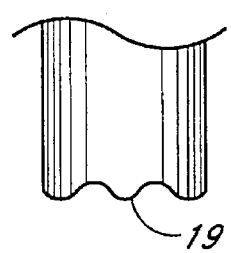

FIGS. 4–8 are illustrative of different sizes and shapes of the scallops or notches that may be formed along the tamp end of first member 10. In FIGS. 4 and 5, two opposite scallops 23 and 24 are formed on the bottom edge 11 of the tamp member 10. These scallops are substantially identical in size, of about the same radius as the radius of the cylinder 10. However, other sizes and shapes may be used, as desired, although sharp corners or edges are preferably avoided. The tamp end 17 of the hollow member shown in FIG. 6 incorporates a single scallop, the tamp end 18 of FIG. 7 shows three scallops, and the tamp end 19 of FIG. 8 shows a plurality of small scallops. Thus, the number and size of the scallops or notches formed at the tamp end of the tamp member are selected for convenience, ease of use and affording accessibility to the hairs. These as well as other embodiments or features of the components of the tamp assembly described herein within the purview of the invention will be evident to those skilled in the art.

What is claimed is:

1. A tamp assembly comprising:
   a first elongated hollow tubular member having first and second open ends, said second end comprising an edge having one or more notches or scallops therealong; and
   a second elongated hollow tubular member for receiving said first member therein and having a first open end for inserting said second end of said first member and a second closed end for bearing the second end of said first member thereagainst, and wherein the length of said second member is less than the length of said first member.

2. The tamp assembly of claim 1 wherein the cross-sectional dimension of said first and second members are substantially uniform along the respective lengths, and wherein the cross-sectional dimension of said second member is greater than the cross-sectional dimension of said first member, whereby the said first member may be removably inserted along substantially the entire length of said second member.

3. The tamp assembly of claim 1 wherein said first and second members are substantially cylindrical along their lengths, respectively, and wherein the diameter of said second member is greater than the diameter of said first member.

4. The tamp assembly of claim 3 wherein the second closed end of said second member comprises a generally flat wall.

5. The tamp assembly of claim 3 wherein said edge of said second end of said first member comprises one or more scallops.

6. The tamp assembly of claim 5 wherein at least one of said scallops has a radius smaller than the radius of said first member.

7. The tamp assembly of claim 5 wherein at least one of said scallops has a radius greater than the radius of said first member.

8. The tamp assembly of claim 5 wherein at least one of said scallops has a radius equal to the radius of said first member.

9. The tamp assembly of claim 5 comprising a plurality of scallops having different radii.

10. The tamp assembly of claim 3 wherein the first end of said first member is flared.

11. The tamp assembly of claim 3 including a base member comprising a body having a cavity therein capable of receiving said second member therein, and a tamp seat member in said cavity for supporting the second end of said second member.

12. The tamp assembly of claim 11 wherein said tamp seat member is reciprocally moveable in said cavity.

13. The tamp assembly of claim 12 wherein said tamp seat member comprises a circular disc, and said cavity is cylindrical, and wherein the diameter of said disc is less than the diameter of said cavity.

14. The tamp assembly of claim 13 including a spring cooperating with said disc for cushioning said tamp seat member.

15. The tamp assembly of claim 1 wherein the second closed end of said second member comprises a generally flat wall.

16. The tamp assembly of claim 15 wherein said edge of said second end of said first member comprises a pair of opposite scallops of substantially the same size and shape.

17. The tamp assembly of claim 16 wherein the scallops have a radius smaller than the radius of said first member.

18. The tamp assembly of claim 16 wherein the scallops have a radius greater than the radius of said first member.

19. The tamp assembly of claim 16 wherein the scallops have a radius equal to the radius of said first member.

20. The tamp assembly of claim 1 wherein said edge of said second end of said first member comprises a pair of opposite scallops of substantially the same size and shape.

21. The tamp assembly of claim 1 wherein the first end of said first member is flared.

22. The tamp assembly of claim 1 including a base member comprising a body having a cavity therein capable of receiving said second member therein, and a tamp seat member in said cavity for supporting the second end of said second member.

23. The tamp assembly of claim 22 wherein said tamp seat member is reciprocally moveable in said cavity.

* * * * *